United States Patent [19]

Nishida et al.

[11] Patent Number: 4,814,916

[45] Date of Patent: Mar. 21, 1989

[54] MAGNETIC DISC MEMORY DEVICE

[75] Inventors: Hiroshi Nishida, Kanagawa; Tsuyoshi Takahashi, Odawara, both of Japan

[73] Assignee: Hitachi, Ltd., Tokyo, Japan

[21] Appl. No.: 341,576

[22] Filed: Jan. 21, 1982

[30] Foreign Application Priority Data

Jan. 28, 1981 [JP] Japan .................. 56-10242

[51] Int. Cl.$^4$ .......................... G11B 5/55; G11B 21/08
[52] U.S. Cl. .................................................. 360/106
[58] Field of Search ......................................... 360/106

[56] References Cited

U.S. PATENT DOCUMENTS 4,423,446 12/1983 Takahashi et al. ................ 360/106

FOREIGN PATENT DOCUMENTS 0163012 12/1979 Japan ................... 360/106

OTHER PUBLICATIONS

Shiraishi et al, "8 Inch Fixed Magnetic Disk Unit", Hitachi Review, vol. 30, No. 2, 1981, pp. 65-69.

Primary Examiner—Robert S. Tupper
Attorney, Agent, or Firm—Antonelli, Terry & Wands

[57] ABSTRACT

A magnetic disc memory device comprises a magnetic head support member pivotably mounted on a shaft, gimbals fixedly supported by one end of the magnetic head support member, a magnetic head core secured to the gimbals, and a magnetic disc for recording and reproducing informations through an action of the magnetic head core. A cam is arranged to be engaged by an end of a cancelling member which is effective to reduce the off-track to zero. The cancelling member is fixedly supported by the other end of the magnetic head support member in a manner to extend in a direction opposite to the gimbals, and is formed of a material having a thermal expansion coefficient equivalent to that of the material forming the gimbals.

24 Claims, 2 Drawing Sheets

MAGNETIC DISC MEMORY DEVICE

FIELD OF THE INVENTION

This invention relates to magnetic head positioning means used with a magnetic disc memory device and the like.

DESCRIPTION OF THE PRIOR ART

Remarkable advances have been made in recent years in the progress of magnetic disc memory device used as an external memory of a computer, and various companies concerned in the production of computers vie with one another for supremacy in relability, memory capacity, size, cost, etc. Particularly there is an increasingly large demand for magnetic disc memory devices of compact size, low cost and large memory capacity suitable for use with office computers generally used in business offices. The most difficult and important problem that should be solved for magnetic disc devices of compact size developed to meet the aforesaid demand is how to increase the information recording density of a magnetic disc. An increase in recording density permits the memory capacity to be increased without increasing the size of the device, so that this solution matches the demand for improvements in magnetic disc memory devices for office computers. To increase recording density, it is important that the number of tracks per disc (increase in track density) and the capacity per track (increase in bit density) be increased. The bit density has its upper limit decided by the characteristics of magnetic discs and magnetic heads, and it is generally in the range between 8,000 and 10,000 bits per inch (BPI). The upper limit of the track density is generally 500 tracks per inch (TPI) for relatively expensive devices in which a voice coil motor and other parts are used for positioning the head in closed loop control, and in the range between 150 and 200 TPI for relatively inexpensive devices using a step motor and other parts for positioning the head in open loop control. Thus in a magnetic disc memory device of low price, it is very important to increase track density by a device that involves no great increase in cost. The reason why the highest track density is about 200 TPI nowadays for magnetic disc memory devices of low price will be described in some detail.

Figure 1:
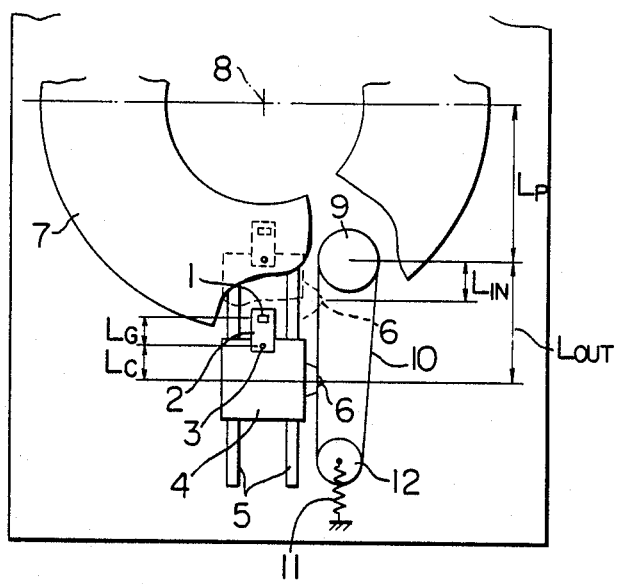
FIG. 1 is a plan view of the magnetic head positioning means of a magnetic disc memory device of the prior art.

FIG. 1 shows magnetic head positioning means often used with a magnetic disc memory device of low price of the prior art. A magetic head 1 is secured by means of gimbals 2 to a carriage 4 which is movable radially of a magnetic disc 7 along a pair of quide bars 5. The carriage 4 is driven for positioning by a steel belt 10 wound on a step motor output shaft 9 at one end thereof, the steel belt 10 being suitably tensioned by a roller 12 which tensions the other end of the steel belt 10 while engaging a spring 11. Thus it is possible to position the magnetic head in any location as desired by controlling the step motor output shaft 9.

The temperature at which magnetic disc memory devices of compact size is used ranges between 0° and 50° C., with a temperature difference of about 50° C. Errors that might occur in head positioning due to the differences in coefficient of thermal expansion between various parts of the device caused by the temperature difference will be discussed.

Let the distance between the disc center 8 and the position in which the step motor output shaft 9 is supported, the distance between a carriage fixing screw 6 and the center of the step motor output shaft 9 when the magnetic head 1 is positioned on the innermost track on the disc 7 (in this case, the carriage 4 being moved to a broken line position) and the distance between the carriage fixing screw 6 and the center of the step motor output shaft 9 when the magnetic head 1 is positioned on the outermost track on the disc 7 be denoted by $L_P$, $L_{IN}$ and $L_{OUT}$, respectively. Also let the length of the gimbals 2 and the distance between the carriage fixing screw 6 (the position in which the carriage 4 is fixed) and a position 3 in which the gimbals 2 are fixed be denoted by $L_G$ and $L_C$, respectively. Then the distance between the innermost track and the outermost track on the disc 7 or the stroke $L_S$ of the carriage 4 can be expressed as follows:

$$L_S = L_{OUT} - L_{IN} \tag{1}$$

Various parts of the device are determined to have the following conefficients of thermal expansion:

| | |
|---|---|
| Magnetic disc | $\alpha D$ (°C.$^{-1}$) |
| Base | $\alpha B$ (°C.$^{-1}$) |
| Gimbals | $\alpha G$ (°C.$^{-1}$) |
| Carriage | $\alpha C$ (°C.$^{-1}$) |
| Steel belt | $\alpha S$ (°C.$^{-1}$) |

The displacement $\Delta L_{IN}$ (mm/°C.) of the magnetic head 1 from the innermost track due to thermal expansion (the displacement being hereinafter referred to as "off-track") can be expressed as follows when the off-track toward the outer periphery is considered positive:

$$\Delta L_{IN} = \alpha B L_P + \alpha S L_{IN} - \alpha C L_C - \alpha G L_G - \alpha D(L_P + L_{IN} - L_C - L_G) \tag{2}$$

Likewise, the off-track of the magnetic head 1 from the outermost track $\Delta L_{OUT}$ (mm/°C.) can be expressed as follows:

$$\Delta L_{OUT} = \alpha B L_P + \alpha S L_{OUT} - \alpha C L_C - \alpha G L_G - \alpha D(L_P + L_{OUT} - L_C - L_G) \tag{3}$$

Thus the difference between the off-track from the outermost track and the off-track from the innermost track can be expressed as follows from equations (1), (2) and (3):

$$\Delta L_{OUT} - \Delta L_{IN} = \alpha S(L_{OUT} - L_{IN}) - \alpha D(L_{OUT} - L_{IN}) = L_S(\alpha S - \alpha D) \tag{4}$$

To reduce the off-track to zero (0), one has only to set the dimensions and thermal expansion coefficients of various parts that the relation, $\Delta L_{IN} = \Delta L_{OUT} = 0$, holds. However, as can be clearly seen in equation (4), it is necesssary that $\alpha S = \alpha D$ to let the relation $\Delta L_{IN} = \Delta L_{OUT} (=0)$ hold. Since the magnetic disc 1 is usually formed of aluminum base material and the steel belt 10 is usually formed of stainless steel base material, it is impossible to obtain the relation $\alpha S = \alpha D$. For example, assume that $L_S = 25$ mm, $\alpha S = 16.8 \times 10^{-6} °C.^{-1}$ and $\alpha D = 23.8 \times 10^{-6} °C.^{-1}$. Then the following relation is obtained by substituting the above-mentioned values into equation (4):

$$\Delta L_{OUT} - \Delta L_{IN} = 25 \times (16.8 \times 10^{-6} - 23.8 \times 10^{-6}) = -1.75 \times 10^{-4} \text{ mm/°C.}$$

when the temperature is 50° C., $50 \times 1.75 \times 10^{-4} = 8.75 \times 10^{-3}$ mm. Thus, even if one of off-tracks from the innermost track and the outermost track is reduced to zero (0), an off-track of $8.75-10^{-3}$ mm will occur from the other track. With the track density of 200 TPI, the track pitch is 0.127 mm. Thus a magnetic disc with a track width of about 0.09 mm is often used. Since an allowable off-track is generally considered to be about 10% of the track width, an allowable off-track for a device of a 200 TPI is about $9 \times 10^{-3}$ mm which is substantially equal to the aforesaid off-track $8.75 \times 10^{-3}$ mm. Thus, the uppermost limit of the track density has hitherto been 200 TPI.

SUMMARY OF THE INVENTION

Accordingly this invention has as its object the provision of magnetic head positioning means for a magnetic disc memory device which is free from the influences exerted on various parts of the device by thermal expansion thereof, in order that the track density that has hitherto been restricted by the differences in thermal expansion between the various parts can be greatly improved.

According to one of the features of the invention, a magnetic disc memory device including magnetic head positioning means of the rotary drive type comprises a shaft, a magnetic head support member pivotable about the shaft, gimbals fixedly supported by one end of the magnetic head support member at a certain angle with respect to a longitudinal direction of the support member, a magnetic head core secured to the gimbals, a member fixedly supported by the other end of the magnetic head support member in a manner to extend in a direction opposite to the gimbals, the member being formed of a material similar to the material forming the gimbals or of a material having a coefficient of thermal expansion equivalent to that of the material forming the gimals, a cam arranged to be engaged by one end of the member, and a magnetic disc for recording and reproducing information through an action of the magnetic head core.

Additional and other objects, features and advantages of the invention will become apparent from the description of preferred embodiments of the invention made by referring to FIGS. 2-5.

DESCRIPTION OF THE PREFERRED EMBODIMENTS

Figure 2:
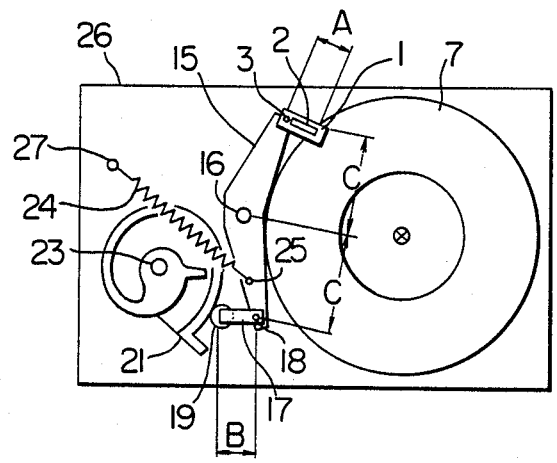
FIG. 2 is a plan view of a magnetic disc memory device incorporating therein the magnetic head positioning means according to an embodiment of the invention.

One embodiment of the invention will now be described by referring to FIGS. 2-4. FIG. 2 shows in a plan view of a magnetic disc device incorporating therein the head positioning means according to an embodiment of the invention. A carriage 15 formed of aluminum and movable about a shaft or pivot 16 supports at one end thereof a magnetic head core 1 through gimbals 2 (of a length A) of stainless steel material fixedly supported at a certain angle with respect to a longitudinal direction of the carriage 15. To the other end of the carriage 15 is secured, through a mounting pin 18, a member 17 of a length B formed of the same stainless steel material as the gimbals 2 which has connected to its forward end a cam follower 19 formed of stainless steel through a pin 20 (See FIG. 4). The sum of the length B of the member 17 and the radius of the cam follower 19 is equal to the length A of the gimbals 2. The carriage or magnetic head support member 15 is mounted on the shaft 16 at a longitudinally center position of the support member 15, and the member 17 extends in a direction opposite to the extending direction of the gimbals 2, as shown in FIG. 2. A cam 21 formed of aluminum is secured to a step motor output shaft 23 and is adapted to be positioned in accordance with a control angle of a step motor 22. The cam follower 19 is forced against the cam 21 by a spring 24 at a suitable pressure. The spring 24 is secured at one end thereof to a pin 25 on the carriage 15 and at the other end thereof to a pin 27 on a base 26. As the step motor 22 is rotated and positioned by an electric signal, the cam 21 is fixed in a predetermined position, so that the carriage 15 restrained by the cam follower 19 and spring 24 moves about the pivot 16 to accurately position the magnetic head core 1 on a magnetic disc 7. The magnetic disc 7 is driven by a motor, not shown, directly connected thereto which is secured on the base 26.

As can be seen in FIG. 2, it is only the gimbals 2, member 17 and cam follower 19 (which are all formed of stainless steel) that are not formed of aluminum. Thus an elongation of the gimbals 2 caused by temperature difference is equal to an elongation of the member 17 and cam follower 19. It will be apparent, therefore, that if the distance between the center of the carriage 15 (i.e., the position of the pivot 16) and the position 3 in which the gimbals 2 are secured, and the distance between the center 16 and the position 18 in which the member 17 is secured are made equal to each other as shown by the character C in FIG. 2, the off-track in this system can be made zero (0).

Figure 3:
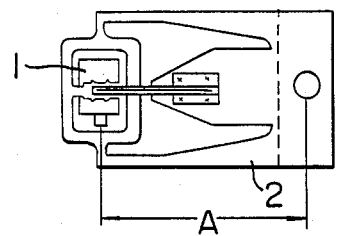
FIG. 3 is a plan view of the magnetic head and the gimbals, showing their structural relationship.
Figure 4:
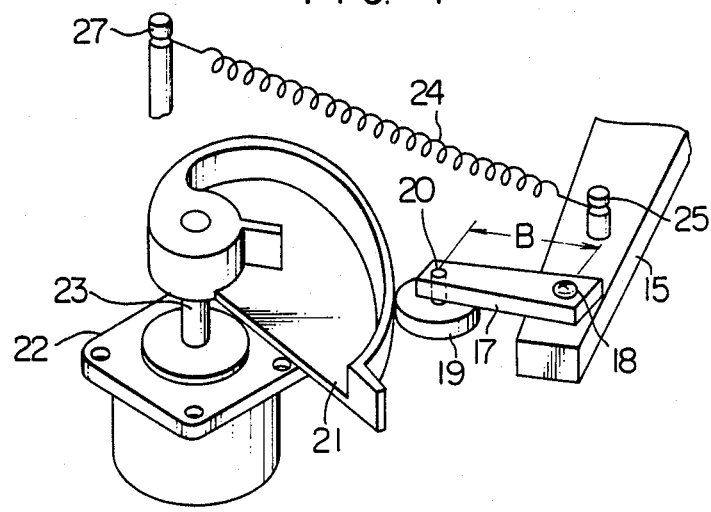
FIG. 4 is a perspective view of the cam follower and the carriage, showing their constructions.
Figure 5:
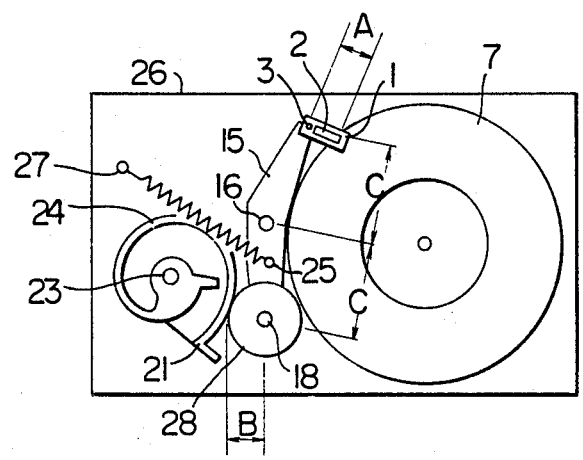
FIG. 5 is a plan view of a magnetic disc memory device incorporating therein the magnetic head positioning means according to another embodiment of the invention.

FIG. 5 shows another embodiment of the invention which is distinct from the embodiment shown in FIGS. 2 to 4 in that a roller 28 alone (which is formed of stainless steel) is used as a cam follower. By setting the radius B of the roller 28 at the same value as the length A of the gimbals 2, it is possible to reduce the off-track to zero (0).

In the foregoing description, the gimbals 2, member 17, cam follower 19 and roller 28 have been described as being formed of stainless steel. However, it is not essential that they are all formed of the same material. What is important is that the materials forming them all have the same coefficient of thermal expansion. Aluminum alloys of high silicon content containing silicon as impurities can have their coefficient of thermal expansion varied by controlling their silicon contents. Thus, it is possible to construct the device which includes the gimbals 2 formed of stainless steel having resiliency, and the member 17 and cam follower 19 formed of an aluminum alloy of high silicon content.

According to the invention, it is possible to reduce the off-track to zero (0) that may result from the differences in coefficient of thermal expansion between the various parts, thereby making it possible to disregard an off-track that may be caused by temperature variation. By applying the present invention, it is possible to obtain a track density in the range between 400 and 500 TPI, which significantly exceeds the track density of 200 PTI that has hitherto been considered as the upper limit for the open loop system.

What is claimed is:

1. A magnetic disc memory device including magnetic head positioning means of the rotary drive type comprising:
   a shaft,
   a magnetic head support member pivotable about said shaft,
   gimbals fixedly supported by one end of said magnetic head support member at a certain angle with respect to a longitudinal direction of the latter support member,
   a magnetic head core secured to said gimbals,
   a member fixedly supported by the other end of said magnetic head support member in a manner to extend in a direction opposite to said gimbals, and being formed of a material having a coefficient of thermal expansion equivalent to that of the material forming said gimbals,
   a cam arranged to be engaged by one end of said member, and
   a magnetic disc for recording and reproducing information through an action of said magnetic head core.

2. A magnetic disc memory device as claimed in claim 1, wherein said magnetic head support member is mounted on said shaft at a longitudinally intermediate position of said support member, and said member has a length equal to the length of said gimbals.

3. A magnetic disc memory device as claimed in claim 2, wherein said gimbals and said member supported by said magnetic head support member are formed of stainless steel.

4. A magnetic disc memory device as claimed in claim 2, wherein said gimbals supported by said magnetic head support member are formed of stainless steel and said member supported by said magnetic head support member is formed of an aluminum alloy of high silicon content.

5. A magnetic disc memory device as claimed in claim 1, wherein all components of said magnetic disc memory device subject to thermal expansion for causing a change from a desired positional relation between said magnetic head core and a track of said magnetic disc other than said gimbals and said member have the same coefficient of thermal expansion which is different from the coefficient of thermal expansion of said gimbals and said member, said gimbals and said member being supported by said magnetic head support member at positions of equal distance from said shaft.

6. A magnetic disc memory device as claimed in claim 5, wherein said gimbals and said member extend from said magnetic head support member in opposite directions and at the same angle with respect to said magnetic head supporting member, said member having a length equal to the length of said gimbals.

7. A magnetic disc memory device as claimed in claim 1, wherein said magnetic head support member, said cam and said magnetic disc are formed of materials having equivalent coefficients of thermal expansion, said member supported by said magnetic head support member being positioned in relation to said gimbals so that thermal variation of said gimbals in at least one direction resulting in a change from a desired positional relation between said magnetic head core and a track of a said magnetic disc is compensated by a corresponding thermal variation of said member supported by said magnetic, head support member, whereby accurate positioning of said magnetic head core with respect to a track of said magnetic disc is substantially independent of temperature.

8. A magnetic disc memory device as claimed in claim 7, wherein said gimbals and said member supported by said magnetic head support member are positioned equal distances from said shaft, and said member has a length equal to the length of said gimbals.

9. A magnetic disc memory device including magnetic head positioning means of the rotary drive type comprising:
   a shaft,
   a magnetic head support member pivotably mounted on said shaft,
   gimbals fixedly supported by one end of said magnetic head support member at a certain angle with respect to a longitudinal direction of the latter support member,
   a magnetic head core secured to said gimbals,
   a roller supported by the other end of said magnetic head support member, and being formed of a material having a coefficient of thermal expansion equivalent to that of the material forming said gimbals,
   a cam arranged to be engaged by said roller, and
   a magnetic disc for recording and reproducing informations through an action of said magnetic head core.

10. A magnetic disc memory device as claimed in claim 9, wherein the length of said gimbals supported by said magnetic head support member and the radius of said roller supported by said magnetic head support member are equal to each other in value.

11. A magnetic disc memory device as claimed in claim 10, wherein said gimbals and said roller supported by said magnetic head support member are formed of stainless steel.

12. A magnetic disc memory device as claimed in claim 10, wherein said gimbals supported by said magnetic head support member are formed of stainless steel, while said roller is formed of an aluminum alloy of high silicon content.

13. A magnetic disc memory device as claimed in claim 9, wherein said magnetic head support member, said cam and said magnetic disc are formed of materials having equivalent coefficients of thermal expansion, said roller being positioned in relation to said gimbals so that thermal variation of said gimbals in at least one direction resulting in a change in a desired positional relation between said magnetic head core and a track of said magnetic disc is compensated by a corresponding thermal variation of said roller, whereby accurate positioning of said magnetic head core with respect to a track of said magnetic disc is substantially independent of temperature.

14. A magnetic disc memory device as claimed in claim 13, wherein said gimbals and said roller are positioned equal distances from said shaft and said roller has a radius equal to the length of said gimbals.

15. A magnetic disc memory device including magnetic head positioning means of the rotary drive type comprising:

a shaft, a magnetic head support member pivotably mounted on said shaft, gimbals fixedly supported by one end of said magnetic head support member at a certain angle with respect to a longitudinal direction of the latter support member, a magnetic head core secured to said gimbals, cancelling means including a member supported by the other end of said magnetic head support member in a manner to extend in a direction opposite to said gimbals, and a roller supported by a free end of said member, said cancelling means being formed of a material having a coefficient of thermal expansion equivalent to that of the material forming said gimble, a cam arranged to be engaged by said roller of said cancelling means, and a magnetic disc for recording and reproducing information through an action of said magnetic head core.

16. A magnetic disc memory device as claimed in claim 15, wherein said magnetic head support member is mounted on said shaft at a longitudinally intermediate position of said support member, and said cancelling means has a length equal to the length of said gimbals.

17. A magnetic disc memory device as claimed in claim 16, wherein said gimbals and said cancelling means supported by said magnetic head support member are formed of stainless steel.

18. A magnetic disc memory device as claimed in claim 16, wherein said gimbals supported by said magnetic head support member are formed of stainless steel, while said cancelling means is formed of an aluminum alloy of high silicon content.

19. A magnetic disc memory device as claimed in claim 18, wherein all components of said magnetic disc memory device subject to thermal expansion for causing a change from a desired positional relation between said magnetic head core and the track of said magnetic disc other than said gimbals and said roller have the same coefficient of thermal expansion which is different from the coefficient of thermal expansion of said gimbals and said roller, said gimbals and said roller being supported by said magnetic head support member at positions of equal distance from said shaft.

20. A magnetic disc memory device as claimed in claim 19, wherein said gimbals and said roller extend from said magnetic head support member in opposite directions and at the same angle with respect to said magnetic head support member, said roller having a radius equal to the length of said gimbals.

21. A magnetic disc memory device as claimed in claim 15, wherein all components of said magnetic disc memory device subject to thermal expansion for causing a change from a desired positional relation between said magnetic head core and a track of said magnetic disc other than said gimbals and said cancelling means have the same coefficient of thermal expansion which is different from the coefficient of thermal expansion of said gimbals and said cancelling means, said gimbals and said cancelling means being supported by said magnetic head support member at positions of equal distance from said shaft.

22. A magnetic disc memory device as claimed in claim 21, wherein said gimbals and said cancelling means extend from said magnetic head support member in opposite directions and at the same angle with respect to said magnetic head support member, said cancelling means having a length equal to the length of said gimbals.

23. A magnetic disc memory device as claimed in claim 15, wherein said magnetic head support member, said cam and said magnetic disc are formed of materials having equivalent coefficients of thermal expansion, said cancelling means being positioned in relation to said gimbals so that thermal variation of said gimbals in at least one direction resulting in a change in a desired positional relation between said magnetic head core and a track of said magnetic disc is compensated by a corresponding thermal variation of said member, whereby accurate positioning of said magnetic head core with respect to a track of said magnetic disc is substantially independent of temperature.

24. A magnetic disc memory device as claimed in claim 23, wherein said gimbals and said member of said cancelling means are positioned equal distances from said shaft, and said cancelling means has a length equal to the length of said gimbals.

* * * * *